United States Patent
Zong et al.

(10) Patent No.: US 11,808,357 B2
(45) Date of Patent: Nov. 7, 2023

(54) SEAL INCLUDING COATING AND METHOD OF FORMING

(71) Applicant: SAINT-GOBAIN PERFORMANCE PLASTICS CORPORATION, Solon, OH (US)

(72) Inventors: Zong Zong, Southborough, MA (US); Jiezhu Jin, Westborough, MA (US); Nafih Mekhilef, Shrewsbury, MA (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 249 days.

(21) Appl. No.: 16/731,248

(22) Filed: Dec. 31, 2019

(65) Prior Publication Data

US 2020/0208744 A1    Jul. 2, 2020

Related U.S. Application Data (60) Provisional application No. 62/786,863, filed on Dec. 31, 2018.

(51) Int. Cl.
*F16J 15/3284* (2016.01)
*F16J 15/3272* (2016.01)

(52) U.S. Cl.
CPC ....... *F16J 15/3284* (2013.01); *F16J 15/3272* (2013.01)

(58) Field of Classification Search
CPC .......... F16J 15/02; F16J 15/021; F16J 15/022; F16J 15/10; F16J 15/102; F16J 15/16; F16J 15/32; F16J 15/3272; F16J 15/3284
See application file for complete search history.

(56) References Cited

U.S. PATENT DOCUMENTS

| | | | |
|---|---|---|---|
| 5,492,336 A * | 2/1996 | Barna | F16J 15/022 277/609 |
| 5,551,706 A * | 9/1996 | Barna | F16J 15/022 277/609 |
| 6,723,916 B2 * | 4/2004 | Flaherty | H05K 9/0015 174/376 |
| 9,108,012 B2 | 8/2015 | Pryce Lewis et al. | |
| 9,211,658 B2 | 12/2015 | Price Lewis et al. | |
| 9,387,508 B2 | 7/2016 | Handy et al. | |

(Continued)

FOREIGN PATENT DOCUMENTS

| | | |
|---|---|---|
| DE | 10353011 A1 | 6/2005 |
| GB | 2331137 A | 5/1999 |

(Continued)

OTHER PUBLICATIONS

International Search Report and Written Opinion for PCT/US2019/069079, dated Apr. 24, 2020, 10 pages.

*Primary Examiner* — Gilbert Y Lee
(74) *Attorney, Agent, or Firm* — Abel Schillinger, LLP; Ann Palma (57) ABSTRACT

A seal can include a seal body and a coating disposed on a surface of the seal body. The seal body can include a high-performance thermoplastic material. The coating can include a fluoropolymer. In an embodiment, the seal can have a wear rate of at most $3.7 \times 10^{-6}$ mm$^3$/(N·m). A method of forming a seal can include forming a seal body and disposing a coating over a surface of the seal body.

20 Claims, 4 Drawing Sheets

(56) References Cited

U.S. PATENT DOCUMENTS

| | | | |
|---|---|---|---|
| 9,702,462 B2 | 7/2017 | Celik et al. | |
| 9,714,463 B2 | 7/2017 | White et al. | |
| 9,849,483 B2 | 12/2017 | Handy et al. | |
| 2006/0029795 A1 | 2/2006 | Sawyer et al. | |
| 2006/0249917 A1* | 11/2006 | Kosty | F16J 15/3288 277/608 |
| 2007/0045967 A1* | 3/2007 | Park | F16J 15/3284 277/534 |
| 2007/0210528 A1* | 9/2007 | Baber | F16J 15/104 277/549 |
| 2008/0032080 A1* | 2/2008 | Faulkner | C09K 3/1009 524/505 |
| 2010/0116422 A1 | 5/2010 | Vaideeswaran et al. | |
| 2010/0186740 A1 | 7/2010 | Lewis et al. | |
| 2012/0003497 A1 | 1/2012 | Handy et al. | |
| 2012/0067883 A1* | 3/2012 | Montuori | B32B 38/04 277/654 |
| 2013/0175766 A1* | 7/2013 | Scholz | F16J 15/104 277/590 |
| 2013/0337218 A1* | 12/2013 | Liu | B29C 66/91411 156/110.1 |
| 2017/0166743 A1 | 6/2017 | Yoon et al. | |
| 2017/0191565 A1* | 7/2017 | Cheng | F16J 15/3284 |
| 2017/0358445 A1 | 12/2017 | O'Shaughnessy et al. | |
| 2018/0209543 A1 | 7/2018 | Nachtmann | |

FOREIGN PATENT DOCUMENTS

| | | | |
|---|---|---|---|
| JP | S63280967 A | 11/1988 | |
| JP | 2011047513 A | 3/2011 | |
| WO | WO-9424467 A1 * | 10/1994 | F16J 15/104 |
| WO | WO-2020159423 A1 * | 8/2020 | F16J 15/56 |

* cited by examiner

SEAL INCLUDING COATING AND METHOD OF FORMING

CROSS-REFERENCE TO RELATED APPLICATION(S)

This application claims priority under 35 U.S.C. § 119(e) to U.S. Provisional Application No. 62/786,863, entitled "SEAL INCLUDING COATING AND METHOD OF FORMING," by Zong ZONG et al., filed Dec. 31, 2018, which is assigned to the current assignee hereof and incorporated herein by reference in its entirety.

FIELD OF THE DISCLOSURE

This disclosure, in general, relates to seals including a coating and methods of forming the same, and, in particular, to thermoplastic seals including a coating and methods of forming the same.

BACKGROUND

Polymeric seals have been used in various industries. High-performance polymers have greater chemical compatibility, temperature stability, and mechanical resistance over standard elastomers. Seals formed with high-performance polymers can be used over a temperature range from cryogenic to +650° F. and can handle high loads and pressure.

PTFE filled polymers are highly desirable for a variety of applications for their wear characteristics and low friction. However, PTFE filled high-performance polymers, such as PTFE filled PEEK, may be difficult to use with typical heat welding processes, which is used in forming large diameter seals (e.g., having diameters of at least 600 mm), as large diameter seals cannot be easily made using molding techniques. Specifically, the welded portion of PTFE filled PEEK often shows a reduced elongation-at-break as compared to the unfilled PEEK. This makes such PTFE filled high performance polymer is less suitable for applications such as large diameter seals.

The industry continues to demand seals with improved properties and performance.

BRIEF DESCRIPTION OF THE DRAWINGS

Embodiments are illustrated by way of example and are not limited in the accompanying figures.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single embodiment is described herein, more than one embodiment may be used in place of a single embodiment. Similarly, where more than one embodiment is described herein, a single embodiment may be substituted for that more than one embodiment.

Unless otherwise defined, all technical and scientific terms used herein have the same meaning as commonly understood by one of ordinary skill in the art to which this invention belongs. The materials, methods, and examples are illustrative only and not intended to be limiting. To the extent that certain details regarding specific materials and processing acts are not described, such details may include conventional approaches, which may be found in reference books and other sources within the manufacturing arts.

Embodiments relate to seals including a seal body and a coating overlying at least a portion of the seal body. The seal body can include a high-performance polymer, and the coating can include a fluoropolymer. The seal can have improved mechanical property, such as tensile strength and elongation-at-break, and tribological property, such as coefficient of friction and wear resistance, compared to a conventional seal formed with a high-performance polymer or a PTFE filled high-performance polymer. Further embodiments relate to a process of forming a seal including a coating overlying at least a portion of the seal body. In an embodiment, the process can include treating at least a portion of the surface of the seal body and forming the coating on the treated portion of the surface. The process can allow formation of seals having improved property and performance.

Seals of embodiments herein can be used by various industries, such as oil and gas, agriculture machinery, automotive, power plants, aerospace, or the like, and suitable for various applications, including pumps and compressors, dispensing equipment, metering instruments, swivel joints, actuators, propulsion units, or valves. The seals can have different shapes that suit various applications. In an example, the seals can include a ring-shaped seal, such as in particular instances, a large diameter seal ring, a back-up ring, U-cup seal, lip seal, or split seal.

Figure 1A:
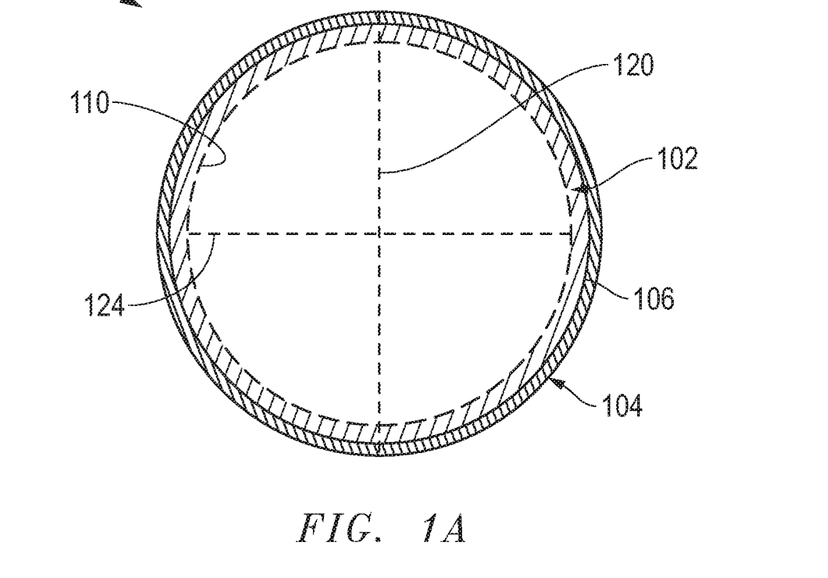
FIG. 1A includes an illustration of a plan view of a seal according to an embodiment.
Figure 1B:
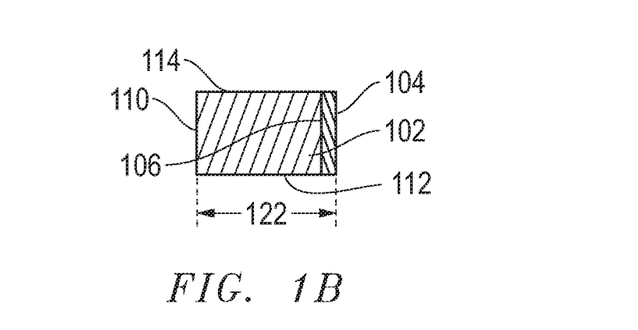
FIG. 1B includes an illustration of a cross section of the seal illustrated in FIG. 1A.

In an embodiment, the seal can include a seal body and a coating overlying at least a portion of the surface of the seal body. FIG. 1A includes an illustration of an exemplary seal 100 including a seal body 102 and a coating 104. In an aspect, the coating 104 can be disposed on at least a portion of the outer surface of the seal body 102. For instance, as illustrated in FIGS. 1A and 1B, the outer peripheral surface 106 is coated and abuts the coating 104, and the inner surface 110 is not coated. The outer peripheral surface 106 can define the outer circumference of the seal body 102, and the seal body 102 can have an outer diameter 120. The seal body 120 can also include an inner circumference defined by the inner surface 110 and an inner diameter 124.

Figure 1C:
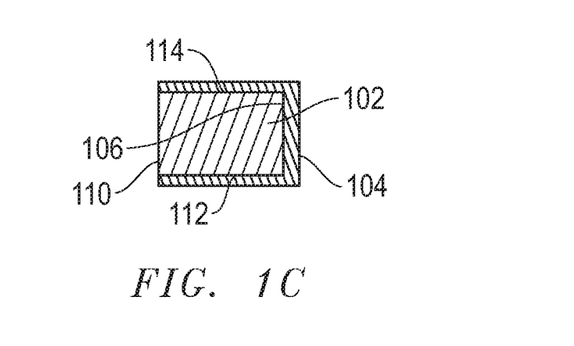
FIG. 1C includes another illustration of a cross section of the seal according to an embodiment.

Referring to FIG. 1B, a cross-sectional view of the seal 100 is illustrated. The seal body 120 can have a radial thickness 122 extending between the inner surface 110 and the outer peripheral surface 106. The opposite faces 114 and 112, which as illustrated in FIG. 1B, are the upper and lower outer surfaces of the body 102, are not covered by the coating 104. Alternatively, in another instance, as illustrated in FIG. 1C, the coating 104 can be disposed on all 3 outer surfaces including the peripheral surface 106 and the upper and lower surfaces 114 and 116 of the seal body 102.

Figure 2:
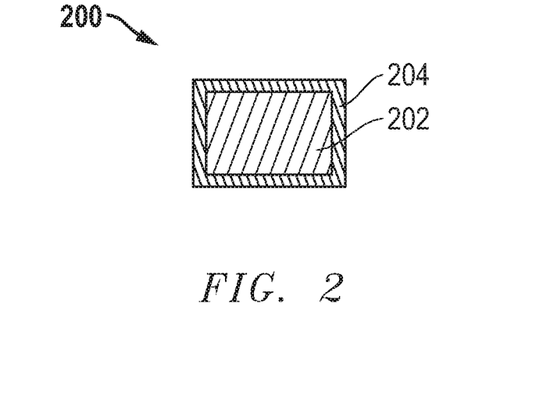
FIG. 2 includes an illustration of a cross section of a seal according to an embodiment.

In another aspect, the coating 104 can cover the entire surface of the seal body. Referring to FIG. 2, a cross section of an exemplary seal 200 is illustrated. The coating 204 is disposed over the entire surface of the seal body 202.

In an embodiment, the seal body (e.g., 102 illustrated in FIGS. 1A to 1C or 202 illustrated in FIG. 2) can include a high-performance polymer. An example of high-performance polymer can include a high-performance thermoplastic material. In another example, the high-performance polymer can have a Young's modulus of at least 0.1 GPa or at least 0.2 GPa. In a further example, the high-performance polymer can include polyarylketone, polyimide, aliphatic and aromatic polyamide (PA or PPA), polyester, polyetherimide (PEI), polyamideimide (PAI) liquid crystal polymer (LCP), polybenzimidazole (PBI), ultra high molecular weight polyethylene (UHMWPE), polysulfones (PPS, PES, PPSU, PESU), polytetrafluoroethylene perfluoroether (PFA), polycholoro-trifluoroethylene (PCTFE), polyethylenetetrafluoroethylene (ETFE, polyvinyledene fluoride (PVDF) Polyvinylfluoride (PVF), polyvinyledene fluoride-hexafluoropropylene (VF2-HFP), polyketone (PK), polyetherketone (PEK), or any combination thereof. A particular example of the high-performance polymer can include polyketone (PK), polyetherketone (PEK), or a combination thereof. A more particular example of the high-performance polymer can include polyetheretherketone (PEEK), polyetherketoneketone (PEKK), polyetheretherketoneketone (PEEKK), polyetherketone (PEK), polyetherketoneetherketoneketone (PEKEKK), or any combination thereof.

In an embodiment, the seal body can include a particular content of the high-performance polymer that can facilitate improved property of the seal. For instance, the seal body can include at least 51 wt % of the high-performance polymer for a total weight of the seal body, such as at least 59 wt %, at least 67 wt %, at least 72 wt %, at least 78 wt %, at least 80 wt %, at least 88 wt %, or at least 95 wt % of the high-performance polymer for the total weight of the seal body. In another instance, the seal body can include at most 99 wt % of the high-performance polymer for a total weight of the seal body, such as at most 95 wt %, at most 90 wt %, at most 85 wt %, at most 80 wt % of the high-performance polymer for the total weight of the seal body. Moreover, the seal body can include the high-performance polymer in a content in a range including any of the minimum and maximum percentages noted herein. In a particular instance, the seal body can include fluoropolymer in a content of at most 5 wt % or at most 3 wt % or at most 1 wt % for a total weight of the seal body. In a more particular instance, the seal body may include at most 5 wt % of polytetrafluoroethylene (PTFE) for the total weight of the seal body, such as at most 3 wt % or at most 1 wt % or at most 0.5 wt %. For instance, the seal body may be free of a fluoropolymer. In a more particular instance, the seal body can be free of PTFE.

The high-performance polymer can be filled or unfilled. In a particular instance, the seal body can include an unfilled high-performance polymer. In another particular instance, the seal body can consist of one or more of the high-performance polymers noted herein.

In an embodiment, the seal body can include filler. For instance, the seal body can include filled high-performance polymer. In another instance, the filler may be dispersed in a matrix of the high-performance material. In an aspect, the filler can include a solid lubricant. In another aspect, the filler can include an organic material, an inorganic material, or a combination thereof. An organic filler material can include a polymer, such as polyimide, liquid crystal polymers, such as Ekonol® polyester, polybenzimidazole, or another suitable thermoplastic polymer. An inorganic material can include mineral, a ceramic material, or a salt, such as a sulfate, a sulfide, a phosphate, or a combination thereof. An further example of the filler can include alumina ($Al_2O_3$), silica ($SiO_2$), calcium carbonate ($CaCO_3$), titanium oxide ($TiO_2$), tungsten disulfide ($WS_2$), molybdenum disulfide ($MoS_2$), graphite, expanded graphite, graphene, boron nitride (BN), talc, mica, wollastonite, calcium fluoride ($CaF_2$), cerium fluoride ($CeF_3$), a stearate including calcium stearate ($C_{36}H_{70}CaO_4$), potassium stearate ($C_{18}H_{35}KO_2$), or zinc stearate ($C_{36}H_{70}O_4Zn$), silicon carbide, silicon nitride, zirconia, carbon black, pigments, or any combination thereof. In another aspect, the filler can include a fiber, such as aramid carbon fiber, nylon fiber, glass fiber, basalt fiber, polyacrylonitrile fiber, polyaramid fiber, carbon fiber, or any combination thereof. In one particular aspect, the filler may not include a fluoropolymer. In a more particular aspect, the filler may be free of polytetrafluoroethylene (PTFE).

In another embodiment, the seal body can include a particular content of filler that can facilitate improved property of the seal. For instance, the seal body can include at least 1 wt % of the filler for a total weight of the seal body, such as at least 2 wt %, at least 5 wt %, at least 8 wt %, at least 10 wt %, at least 16 wt %, at least 20 wt %, or at least 25 wt % of the filler for the total weight of the seal body. In another instance, the seal body can include at most 49 wt % of the filler for a total weight of the seal body, such as at most 45 wt %, at most 40 wt %, at most 35 wt %, at most 30 wt %, at most 25 wt %, at most 20 wt %, at most 15 wt %, at most 10 wt %, or at most 5 wt % of the filler for the total weight of the seal body. Moreover, the seal body can include the filler in a content in a range including any of the minimum and maximum percentages noted herein. In a particular application, the seal body can consist of the high-performance polymer and the filler material noted herein.

In some particular implementations, the seal body can include a polyketone, such as polyetherketone (PEK), polyetheretherketone (PEEK), polyetherketoneketone (PEKK), polyetheretherketoneketone (PEEKK), polyetherketoneetherketoneketone (PEKEKK), or any combination thereof. In more particular applications, the seal body can include polyetheretherketone (PEEK) and optionally a filler material. For instance, the seal body can consist of polyetheretherketone (PEEK) and a filler material. In another instance, the seal body can consist of polyetheretherketone (PEEK).

In an embodiment, the seal 100 can include an outer diameter 120 of at least 0.2 meters to suit certain applications of the seal. In some instances, the outer diameter 120 can be at least 0.6 meter, at least 1.0 meters, or at least 1.3 meters. The outer diameter 120 can be increased to meet requirements of applications, such as large equipment. For instance, large equipment is demanded by the oil and gas industries for drilling in harsh environments, such as deep water. In another instance, the outer diameter 120 of the seal 100 can be at most 3 meters, at most 2.5 meters, or at most 2.2 meters. Moreover, in some instances, the outer diameter 120 can be in a range including any of the minimum and maximum values noted herein. In some instances, the outer diameter 120 can be at least 5 times the radial thickness 122, such as at least 10 times the radial thickness 122, or even at least 20 times the radial thickness 122. In a particular embodiment, the radial thickness 122 can be at least 2.5 cm, such as at least 5 cm.

In an embodiment, the coating (e.g., 104 or 204) can include a fluoropolymer. An exemplary fluoropolymer can include polytetrafluoroethylene (PTFE), tetrafluoroethylene-hexafluoropropylene (FEP), perfluoroalkoxyethylene (PFA), any derivative thereof, nor any combination thereof. In some instances, the fluoropolymer can include modified or functionalized fluoropolymer. Modification of fluoropolymer can be performed by techniques known in the art including, for instance, irradiation or chemical modification. An exemplary functional group that can be incorporated into the fluoropolymer can include a hydroxyl group (—OH), a carbonyl fluoride (—COF), a carboxyl group (—COOH), a maleic anhydride group (—(CHCO)$_2$O), an acrylate group (—CH$_2$=CHCOOH), a glycidyl methacrylate group (—CH$_2$C(CH$_3$) COOCH$_2$(CHCH$_2$O)), or a combination thereof.

In a particular implementation, the coating can include polytetrafluoroethylene (PTFE). In certain implementations, the coating can consist of one or more of the fluoropolymers noted herein. For instance, in more particular applications, the coating can consist of polytetrafluoroethylene (PTFE). In another embodiment, the coating can further include a material other than the fluoropolymer. For instance, the coating can include a material that can facilitate improved adhesion of the coating. Such material can include, for example, silane.

Figure 3:
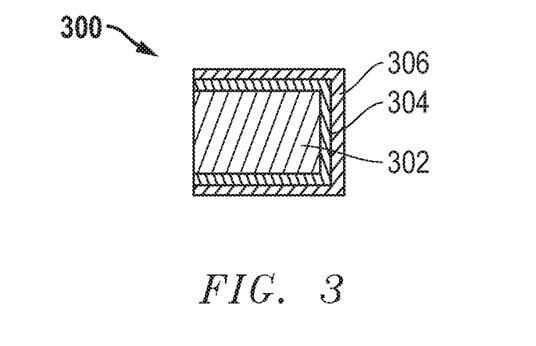
FIG. 3 includes an illustration of a cross section of a seal according to another embodiment.

In an embodiment, the seal can include a single layer of the coating, as illustrated in FIGS. 1A to 1C and 2. In another embodiment, the seal can include a plurality of layers of coating. Referring to FIG. 3, a cross section of a seal 300 is illustrated. The seal 300 includes a seal body 302, a first coating layer 304 that abuts the seal body 302, and a second coating layer 306 in contact with the first layer 304. In an aspect, at least one of the coating layers 304 and 306 can include a fluoropolymer. For instance, the coating layer 306 can include PTFE. In another aspect, the coating layers 304 and 306 can include a common material, such as a fluoropolymer. In yet another aspect, the coating layers 304 and 306 can include a different material, such as a different fluoropolymer.

Figure 4:
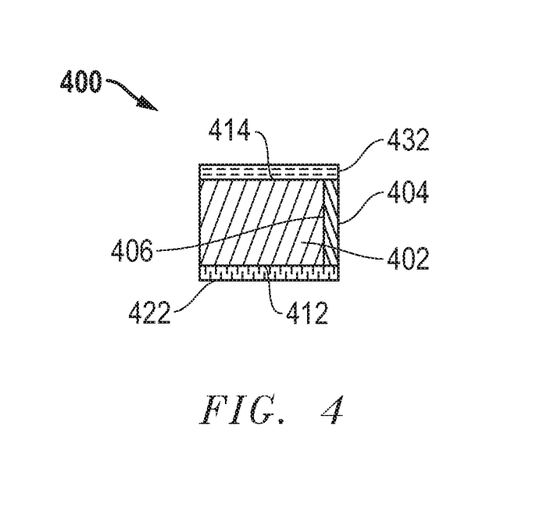
FIG. 4 includes an illustration of a seal according to another embodiment.

FIG. 4 includes an illustration of a cross section of a seal 400 according to another embodiment. As needed, the coating on the outer surfaces 406, 414, and 412 of the seal body 402 can be different in compositions, properties, thickness, or any combination thereof. For example, at least two of the outer surfaces 406, 414, and 412 can be coated with different materials, such as different fluoropolymers. For instance, the outer surface 406 can be coated with PTFE, and 414 can be coated with PFA to allow higher chemical resistance. In another instance, a coating can be disposed on the inner surface 402, wherein the coating can be the same as one of the coatings 404, 422, and 432, or different from all of them in compositions, properties, thickness, or any combination thereof.

In another embodiment, the coating (e.g., 104, 204, 304, 306, 404, 422, or 432 illustrated in FIG. 1A, 1B, 1C, 2, 3, or 4) can have a particular thickness that can facilitate improved property and performance of the seal. In an aspect, the coating can have a thickness of at least 1 micron, at least 2 microns, at least 3 microns, at least 4 microns, at least 6 microns, or at least 8 microns. In another aspect, the coating can have a thickness of at most 20 microns, at most 18 microns, at most 15 microns, or at most 12 microns. In a further aspect, the coating can have a thickness in a range including any of the minimum and maximum values noted herein. For instance, the coating can have a thickness in a range including at least 1 micron and at most 20 microns, or in a range including at least 4 microns and at most 15 microns.

Figure 5:
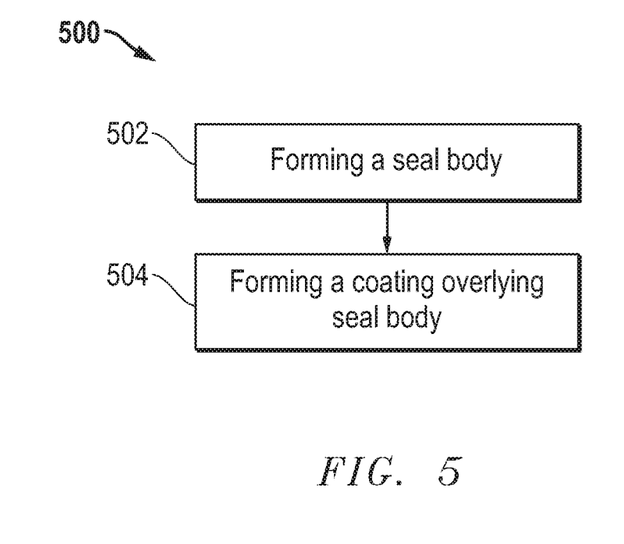
FIG. 5 includes a flow chart illustrating a process for forming a seal according to an embodiment.

FIG. 5 includes a flow chart including a process 500 for forming the seal (e.g., 100). The process can start at block 502, forming the seal body (e.g., 102, 202, 302, or 402). The seal body may be formed utilizing conventional molding techniques for forming a seal, such as extrusion molding, injection molding, hot compression molding, or the like.

Figure 6:
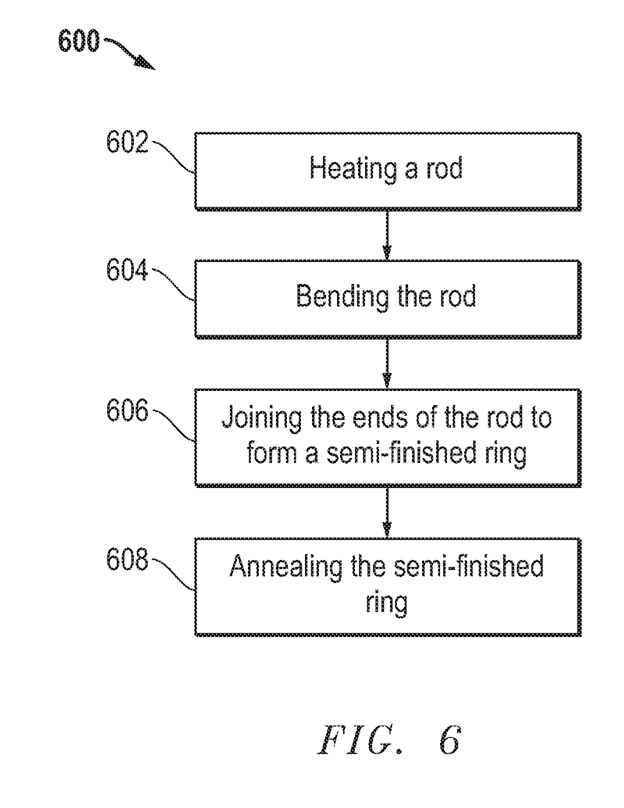
FIG. 6 includes a flow chart illustrating a process for forming a seal body.

In a particular exemplary implementation, forming a seal body can include forming a large diameter seal ring. Referring to FIG. 6, a process 600 of forming a large diameter seal ring is illustrated. The forming process 600 can include heating a rod at block 602. In an aspect, the rod can be an extruded rod, such as a melt extruded rod, compression molded rod, or formed by another technique known in the art. In another aspect, the rod can be a straight rod. Further, the rod may have a cross-section, such as a circular cross-section or a polygonal cross-section. In an example, the cross-section is a polygonal cross-section, such as a polygon with at least four sides. In particular, the polygon may be a rectangle or square, as the seal body illustrated in FIG. 1B, 1C, 2, or 3. In a particular aspect, heating can be conducted at a temperature greater than the glass transition temperature and less than the melting temperature of the high-performance polymer material used to form the rod.

The forming process 600 can continue to block 604. Once heated, the rod can be bent, maybe with aid of a suitable tool, to a desired shape. In an example, the rod may be applied between a three-roller system to aid bending. In another example, the rod may be bent and placed into a mold to complete bending the rod to a desired shape. In a further example, the rod may be clamped to a circular bender and bent through the rotation of the bender.

As an alternative to heating and bending, an extruded rod may be extruded in the form of an arc and the ends of the arc joined to form the seal. In another alternative, arcs may be cut from sheets of material, such as extruded sheets or compression molded sheets, and the ends of the arcs joined.

The process 600 can continue to block 606. In an example, the ends of the rod can be joined to form a semi-finished seal. In another example, the ends of the rod may be joined to the respective ends of another rod or other rods. In an aspect, the ends of the rod may be joined through hot melt welding, injection molding, adhesive, ultrasonic welding, or any combination thereof. In a particular aspect, the ends of the rod are joined through hot melt welding. For example, the hot melt welding may include applying a heat source to the ends of the rod to melt portions of the rod proximal to the ends and once melted, pressing the ends together. In such an example, the ends of the rod are melted without melting the whole rod.

At block 608, the semi-finished seal can be annealed. Annealing can be performed at a temperature greater than the glass transition temperature of the high-performance polymer material. The semi-finished ring may be annealed for a period of at least 2 hours. The semi-finished ring may be further machined or processed to form a seal ring. US Pat. App. No. 2010/0116422 by Vaideeswaran et al., for "Method of Forming Large Diameter Thermoplastic Seal," disclosing a method of forming a large diameter seal ring including welding, is hereby incorporated by reference.

In an embodiment, the process 500 can optionally include treating the surface of the seal body prior to forming the coating. In an aspect, the surface can be treated to facilitate bonding of the coating to the surface of the seal body. In another aspect, treating the surface can include removing a portion of the surface. For instance, the surface may be machined to remove any irregularity, contaminates, or both. In a particular instance, the surface can be treated to have a greater roughness than the untreated surface. In another aspect, treating the surface can include abrasion, thermal treatment, or any combination thereof. In exemplary implementations, surface treatment can be performed by using abrasives, laser beams, or any combination thereof.

Turning to FIG. 5, after forming the seal body, the process 500 can proceed to block 504, forming a coating over the seal body. In an aspect, the coating can be disposed by vapor deposition including chemical vapor deposition, physical vapor deposition, plasma chemical vapor deposition, or plasma-enhanced chemical vapor deposition. In a particular embodiment, the coating can be formed by plasma chemical vapor deposition, or more particularly, plasma-enhanced chemical vapor deposition.

Figure 7:
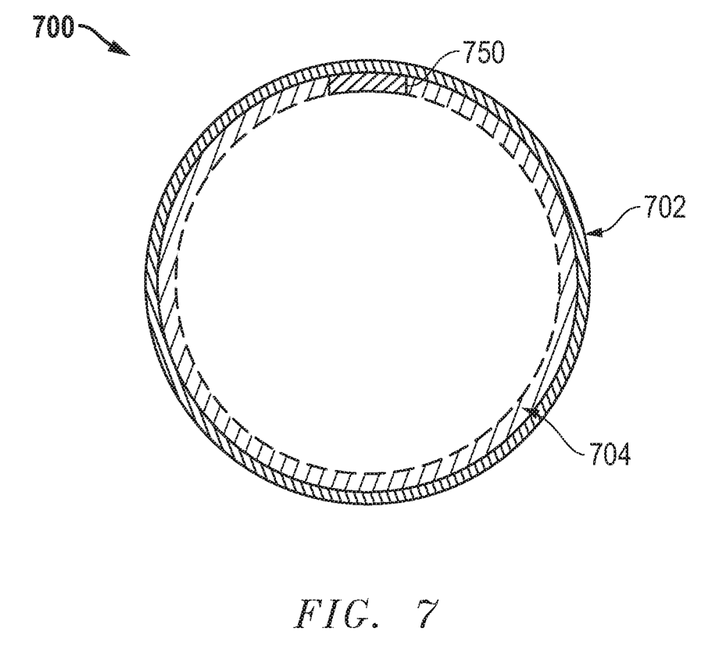
FIG. 7 includes an illustration of a seal according to another embodiment.

FIG. 7 includes an illustration of a seal 700 according to an embodiment. The seal 700 includes the coating 702 over the seal body 704. The seal body includes a welded portion 750, where the ends of the rod are joined.

In an embodiment, the seal (e.g., 100, 200, 300, 400, or 700 illustrated in FIG. 1A, 2, 3, 4, or 7) can have a certain surface roughness that can facilitate improved performance of the seal. In an aspect, at least a portion of the seal surface, such as the coated surface, can have a particular roughness. In an aspect, the seal can have an average surface roughness, such as average $S_a$. $S_a$ is arithmetic mean deviation of the seal surface and determined in accordance with EUR15178EN. As used herein, the average $S_a$ is the average of the Sa of at least three spaced-apart random areas of the seal surface. In an example, the seal surface can have an average $S_a$ of at least 0.92 microns, at least 0.93 microns, at least 0.95 microns, at least 0.96 microns, at least 0.98 microns, at least 1.0 microns, at least 1.1 microns, at least 1.2 microns, at least 1.4 microns, at least 1.5 microns, or at least 1.7 microns. In another instance, the average $S_a$ can be at most 2.6 microns, at most 2.5 microns, at most 2.4 microns, at most 2.2 microns, at most 2.0 microns, at most 1.9 microns, at most 1.7 microns, at most 1.5 microns, at most 1.3 microns, or at most 1.1 microns. Moreover, the seal can have an average $S_a$ in a range including any of the minimum and maximum values noted herein. For instance, the average $S_a$ can be in a range from 0.92 microns to 2.6 microns. In a particular embodiment, the average $S_a$ can be in a range from 1.1 microns to 2.5 microns.

In another aspect, the seal can have an average $S_q$. $S_q$ is root-mean-square (RMS) deviation of the seal surface and determined in accordance with EUR15178EN. As used herein, the average $S_q$ is the average of the $S_q$ of at least three spaced-apart random areas of the seal surface. In an example, the seal surface can have an average $S_q$ of at least 1.0 microns, at least 1.1 microns, at least 1.2 microns, at least 1.3 microns, or at least 1.4 microns. In another instance, the average $S_q$ can be at most 1.6 microns, at most 1.5 microns, at most 1.4 microns, or at most 1.3 microns at most 2.8 microns, at most 2.6 microns, at most 2.5 microns, or at most 2.3 microns. Moreover, the average $S_q$ can be in a range including any of the minimum and maximum values noted herein. For instance, the average $S_q$ can be in a range from 1.0 microns to 2.8 microns.

In an embodiment, the seal (e.g., 100, 200, 300, 400, or 700) can have an improved wear rate. For instance, the wear rate can be at most $3.7 \times 10^{-6}$ mm$^3$/(N·m), at most $3.5 \times 10^{-6}$ mm$^3$/(N·m), at most $3.3 \times 10^{-6}$ mm$^3$/(N·m), at most $3.1 \times 10^{-6}$ mm$^3$/(N·m), at most $2.8 \times 10^{-6}$ mm$^3$/(N·m), at most $2.6 \times 10^{-6}$ mm$^3$/(N·m), at most $2.4 \times 10^{-6}$ mm$^3$/(N·m), at most $2.2 \times 10^{-6}$ mm$^3$/(N·m), at most $2.0 \times 10^{-6}$ mm$^3$/(N·m), at most $1.8 \times 10^{-6}$ mm$^3$/(N·m), at most $1.6 \times 10^{-6}$ mm$^3$/(N·m), or at most $1.5 \times 10^{-6}$ mm$^3$/(N·m). In another instance, the wear rate can be at least $0.2 \times 10^{-6}$ mm$^3$/(N·m), at least $0.3 \times 10^{-6}$ mm$^3$/(N·m), at least $0.5 \times 10^{-6}$ mm$^3$/(N·m), at least $0.7 \times 10^{-6}$ mm$^3$/(N·m), at least $0.9 \times 10^{-6}$ mm$^3$/(N·m), or at least $1.0 \times 10^{-6}$ mm$^3$/(N·m). Moreover, the wear rate can be in a range including any of the minimum and maximum values noted herein.

K-factor ($\times 10^{-6}$ mm$^3$/(N·m)) is used as wear rate in this disclosure and determined using Formula (1) below. Mass loss and sliding distance is tested in accordance with ASTM G137-97, "Standard Test Method for Ranking Resistance of Plastic Materials to Sliding Wear Using a Block-on-Ring Configuration", using the conditions described below.

$$K \text{ factor} = \frac{\text{Mass loss}}{\text{Density} \times \text{Load} \times \text{Sliding distance}} \quad (1)$$

A block sample of the seal is formed having the dimension noted in ASTM G137-97. The block is compressed against an oscillating steel ring under a constant load. The steel ring has a diameter of 35 mm and Ra of 0.3 to 0.4 μm. A Block-On-Ring tribometer is used to conduct a dry test under the conditions disclosed in Table 1 below.

TABLE 1

| | |
|---|---|
| Oscillating angle | 360° |
| Constant load | 200N (Max. Pressure 51 MPa with concentrated load) |
| Speed | 12 rpm (linear velocity 42.5 mm/s) |
| Temperature | Room temperature (20 to 25° C.) |
| Duration | 848 minutes |

In another embodiment, the seal (e.g., 100, 200, 300, 400, or 700) can have an improved elongation at break. As used herein, the elongation at break is determined in accordance with ASTM D638-08, "Standard Test Method for Tensile Properties of Plastics". For instance, the elongation at break can be at least 5%, at least 7%, at least 10%, or at least 15%. In another instance, the elongation at break can be at most 40%, at most 30%, at most 25%, at most 20%, or at most 15%. Moreover, the elongation at break can be in a range including any of the minimum and maximum values noted herein.

In an exemplary application, the seal can be used in off-shore oil drilling equipment. For instance, the seal, such as a back-up ring, can be used in a turret swivel rig or piping system. In a further instance, at the sealing interface, the seal can be disposed such that the coating of the seal is in contact with a metal surface. In another instance, the coating of the seal can be in contact with a polymeric surface.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

EMBODIMENTS

Embodiment 1

A seal, comprising a seal body and a coating disposed on a surface of the seal body, wherein:
the seal body comprises a high-performance thermoplastic material; and the coating comprises a fluoropolymer.

Embodiment 2

The seal of embodiment 1, wherein the seal has a wear rate of at most $3.7 \times 10^{-6}$ mm$^3$/(N·m), at most $3.5 \times 10^{-6}$ mm$^3$/(N·m), at most $3.3 \times 10^{-6}$ mm$^3$/(N·m), at most $3.1 \times 10^{-6}$ mm$^3$/(N·m), at most $2.8 \times 10^{-6}$ mm$^3$/(N·m), at most $2.6 \times 10^{-6}$ mm$^3$/(N·m), at most $2.4 \times 10^{-6}$ mm$^3$/(N·m), at most $2.2 \times 10^{-6}$ mm$^3$/(N·m), at most $2.0 \times 10^{-6}$ mm$^3$/(N·m), at most $1.8 \times 10^{-6}$ mm$^3$/(N·m), at most $1.6 \times 10^{-6}$ mm$^3$/(N·m), or at most $1.5 \times 10^{-6}$ mm$^3$/(N·m).

Embodiment 3

The seal of embodiment 1 or 2, wherein the seal has a wear rate of at least $0.2 \times 10^{-6}$ mm$^3$/(N·m), at least $0.3 \times 10^{-6}$ mm$^3$/(N·m), at least $0.5 \times 10^{-6}$ mm$^3$/(N·m), at least $0.7 \times 10^{-6}$ mm$^3$/(N·m), at least $0.9 \times 10^{-6}$ mm$^3$/(N·m), or at least $1.0 \times 10^{-6}$ mm$^3$/(N·m).

Embodiment 4

The seal of any one of embodiments 1 to 3, wherein the seal comprises a diameter of at least 0.2 meters, at least 0.6 meter, at least 1.0 meters, or at least 1.3 meters.

Embodiment 5

The seal of any one of embodiments 1 to 4, wherein the seal comprises a diameter of at most 3 meters, at most 2.5 meters, or at most 2.2 meters.

Embodiment 6

The seal of any one of embodiments 1 to 5, wherein the high-performance thermoplastic material is unfilled.

Embodiment 7

The seal of any one of embodiments 1 to 6, wherein the seal body consists essentially of the high-performance thermoplastic material.

Embodiment 8

The seal of any one of embodiments 1 to 5, wherein the seal body further comprises a filler dispersed in a matrix of the high-performance thermoplastic material.

Embodiment 9

The seal of embodiment 8, wherein the filler comprises an organic material, an inorganic material, or a combination thereof.

Embodiment 10

The seal of any one of embodiments 8 to 9, wherein the filler comprises a solid lubricant.

Embodiment 11

The seal of any one of embodiments 8 to 10, wherein the filler comprises alumina (Al2O3), silica (SiO2), calcium carbonate (CaCO3), titanium oxide (TiO2), tungsten disulfide (WS2), molybdenum disulfide (MoS2), graphite, expanded graphite, graphene, boron nitride (BN), talc, calcium fluoride (CaF2), cerium fluoride (CeF3), a stearate including calcium stearate (C36H70CaO4), potassium stearate (C18H35KO2), or zinc stearate (C36H70O4Zn), or any combination thereof.

Embodiment 12

The seal of any one of embodiments 8 to 11, wherein the filler comprises a fiber including aramid carbon fiber, glass fiber, basalt, or any combination thereof.

Embodiment 13

The seal of any one of embodiments 1 to 12, wherein the high-performance thermoplastic material comprises polyarylketone, polyimide, aliphatic and aromatic polyamide (PA or PPA), polyester, polyetherimide (PEI), polyamide-imide (PAI) liquid crystal polymer (LCP), polybenzimidazole (PBI), ultra high molecular weight polyethylene (UHMWPE), polysulfones (PPS, PES, PPSU, PESU), polytetrafluoroethylene perfluoroether (PFA), polycholoro-trifluoroethylene (PCTFE), polyethylenetetrafluoroethylene (ETFE, polyvinyledene fluoride (PVDF) Polyvinylfluoride (PVF), polyvinyledene fluoride-hexafluoropropylene (VF2-HFP), polyketone (PK), polyetherketone (PEK), or any combination thereof.

Embodiment 14

The seal of any one of embodiments 1 to 12, wherein the high-performance thermoplastic material comprises polyketone (PK), polyetherketone (PEK), or a combination thereof.

Embodiment 15

The seal of any one of embodiments 1 to 14, wherein the high-performance thermoplastic material comprises polyetheretherketone (PEEK), polyetherketoneketone (PEKK), polyetheretherketoneketone (PEEKK), polyetherketone (PEK), polyetherketoneetherketoneketone (PEKEKK), or any combination thereof.

Embodiment 16

The seal of any one of embodiments 1 to 15, wherein the seal body comprises polytetrafluoroethylene in a content of at most 5 wt % for a total weight of the body.

Embodiment 17

The seal of any one of embodiments 1 to 16, wherein the seal body is essentially free of polytetrafluoroethylene.

Embodiment 18

The seal of any one of embodiments 1 to 17, wherein the seal body consists essentially of a polyketone.

Embodiment 19

The seal of any one of embodiments 1 to 18, wherein the seal body consists essentially of at least one material selected from the group consisting of polyetheretherketone (PEEK), polyetherketoneketone (PEKK), polyetheretherketoneketone (PEEKK), polyetherketone (PEK), and polyetherketoneketoneetherketone (PEKEEK).

Embodiment 20

The seal of any one of embodiments 1 to 19, wherein the seal body consists essentially of polyetheretherketone (PEEK).

Embodiment 21

The seal of any one of embodiments 1 to 20, wherein the seal is in a shape of a ring.

Embodiment 22

The seal of any one of embodiments 1 to 21, wherein the seal comprises a weld.

Embodiment 23

The seal of any one of embodiments 1 to 22, wherein the coating is disposed on an outer surface of the seal body.

Embodiment 24

The seal of any one of embodiments 1 to 23, wherein an outer surface of the seal comprises an average roughness (Sa) of at least 0.92 microns, at least 0.93 microns, at least 0.95 microns, at least 0.96 microns, at least 0.98 microns, at least 1.0 microns, at least 1.2 microns, at least 1.4 microns, at least 1.5 microns, or at least 1.7 microns.

Embodiment 25

The seal of any one of embodiments 1 to 24, wherein outer surface of the seal comprises a roughness (Sa) of at most 2.6 microns, at most 2.4 microns, at most 2.2 microns, at most 2.0 microns, at most 1.9 microns, at most 1.7 microns, at most 1.5 microns, at most 1.3 microns, or at most 1.1 microns.

Embodiment 26

The seal of any one of embodiments 1 to 25, wherein the coating is disposed substantially on an entire surface of the seal body.

Embodiment 27

The seal of any one of embodiments 1 to 26, wherein the coating has a thickness of at most 20 microns, at most 15 microns, or at most 12 microns.

Embodiment 28

The seal of any one of embodiments 1 to 27, wherein the coating has a thickness of at least 4 microns, at least 6 microns, or at least 8 microns.

Embodiment 29

The seal of any one of embodiments 1 to 26, wherein the coating is a single layer.

Embodiment 30

The seal of any one of embodiments 1 to 26, wherein the coating comprises a plurality of layers.

Embodiment 31

The seal of embodiment 30, wherein each layer comprises a same fluoropolymer.

Embodiment 32

The seal of embodiment 30 or 31, wherein each layer consists essentially of the same fluoropolymer.

Embodiment 33

The seal of any one of embodiments 1 to 30, wherein the fluoropolymer comprises polytetrafluoroethylene (PTFE), tetrafluoroethylene-hexafluoropropylene (FEP), perfluoroalkoxyethylene (PFA), or any combination thereof.

Embodiment 34

The seal of any one of embodiments 1 to 33, wherein the coating consists essentially of polytetrafluoroethylene.

Embodiment 35

The seal of any one of embodiments 1 to 33, wherein the coating comprises a material other than fluoropolymer.

Embodiment 36

The seal of embodiment 35, wherein the coating comprises silane.

Embodiment 37

The seal of embodiment 30, wherein each layer comprises a different material.

Embodiment 38

The seal of any one of embodiments 1 to 35, wherein the seal has an elongation at break of at least 5%, at least 7%, at least 10%, or at least 15%.

Embodiment 39

The seal of any one of embodiments 1 to 38, wherein the seal has an elongation at break of at most 40%, at most 30%, at most 25%, at most 20%, or at most 15%.

Embodiment 40

The seal of any one of embodiments 1 to 39, wherein the coating is disposed by vapor deposition.

Embodiment 41

The seal of embodiment 40, wherein the coating is disposed by chemical vapor deposition, physical vapor deposition, plasma chemical vapor deposition, or plasma-enhanced chemical vapor deposition.

Embodiment 42

An apparatus, comprising the seal of embodiment 1, wherein the seal is disposed at a sealing interface, wherein the coating of the seal is in contact with a metal surface.

Embodiment 43

The apparatus of embodiment 42, wherein the coating of the seal is in contact with a polymeric surface.

EXAMPLES

Example 1

Wear rates of bar seal samples C1, S1, and S2 were tested in accordance with embodiments noted herein. C1 included 3 bars made of PEEK. S1 included 3 bar samples, each having a PEEK body and a PTFE coating applied by plasma-enhanced chemical vapor deposition (PECVD). S2 included 3 bars. Each S2 bar had a PEEK body, the surface of which was cleaned by laser ablation prior to application of a PTFE coating by PECVD. Table 2 includes wear rates and coefficient of friction (COF) of the samples. COF is determined by the block-on-ring test described in embodiments herein with the conditions noted in Table 1.

TABLE 2

| Samples | Wear rate ($\times 10^{-6}$ mm$^3$/(N · m)) | COF |
|---|---|---|
| C1 | 1.20 | 0.33 |
| S1 | 2.12 | 0.17 |
| S2 | 3.78 | 0.14 |

Surface roughness of the bars was tested as described in embodiments herein and is included in Table 3 below.

TABLE 3

| Samples | Average $S_a$ (microns) | Average $S_q$ (microns) |
|---|---|---|
| C1 | 0.91 | 1.21 |
| S1 | 0.96 | 1.23 |
| S2 | 1.92 | 2.39 |

Example 2

A sample including a composite layer overlying a PEEK substrate was formed by hot pressing the composite layer consisting of a PEEK film, PTFE fabric and glue and the substrate. Plint test was conducted on the sample. The composite layer was worn out quickly after the test started.

The foregoing embodiments represent a departure from the state-of-the-art. Embodiments are directed to high-performance polymer seals, and particularly high-performance polymer seals with a fluoropolymer coating. The seals were unexpectedly found to have improved wear characteristics compared to unfilled PEEK, because fluoropolymers, e.g., PTFE, compared to some other high-performance polymers, e.g., PEEK, have relatively lower mechanical strength and wear resistance.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Reference herein to a material including one or more components may be interpreted to include at least one embodiment wherein the material consists essentially of the one or more components identified. The term "consisting essentially" will be interpreted to include a composition including those materials identified and excluding all other materials except in minority contents (e.g., impurity contents), which do not significantly alter the properties of the material. Additionally, or in the alternative, in certain non-limiting embodiments, any of the compositions identified herein may be essentially free of materials that are not expressly disclosed. The embodiments herein include range of contents for certain components within a material, and it will be appreciated that the contents of the components within a given material total 100%.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A seal, comprising a seal body in a shape of a ring and a coating disposed on at least a portion of the seal body, wherein:
   the seal body comprises:
      a high-performance thermoplastic material and optionally a filler material, wherein the high-performance thermoplastic material comprises polyarylketone, polyimide, aliphatic and aromatic polyamide (PA or PPA), polyester, polyetherimide (PEI), polyamideimide (PAI) liquid crystal polymer (LCP), polybenzimidazole (PBI), ultra high molecular weight polyethylene (UHMWPE), polysulfones (PPS, PES, PPSU, or PESU), polytetrafluoroethylene perfluoroether (PFA), polycholoro-trifluoroethylene (PCTFE), polyethylenetetrafluoroethylene (ETFE, polyvinlyledene fluoride (PVDF) Polyvinylfluoride (PVF), polyvinyledene fluoride-hexafluoropropylene (VF2-HFP), polyketone (PK), polyetherketone (PEK), polyetheretherketone (PEEK), polyetherketoneketone (PEKK), polyetheretherketoneketone (PEEKK), polyetherketoneetherketoneketone (PEKEKK), or any combination thereof; and
   the coating comprises a fluoropolymer, wherein the coating has a thickness of at most 20 microns, wherein the coating defines:
      at least a portion of an outermost surface that defines an outer diameter of the seal;
      at least a portion of an innermost surface that defines an inner diameter of the seal; or
      both.

2. The seal of claim 1, wherein the entire seal body is formed with the high-performance thermoplastic material and optionally the filler material.

3. The seal of claim 1, wherein the seal body has a wear rate of at most $3.7 \times 10^{-6}$ mm$^3$/(N·m).

4. The seal of claim 1, wherein the outer diameter is at least 0.2 meters.

5. The seal of claim 1, wherein the high-performance thermoplastic material is free of polytetrafluoroethylene.

6. The seal of claim 1, wherein the high-performance thermoplastic material is unfilled.

7. The seal of claim 1, wherein the seal body comprises the filler material dispersed in a matrix of the high-performance thermoplastic material.

8. The seal of claim 7, wherein the filler is free of a fluoropolymer.

9. The seal of claim 1, wherein the high-performance thermoplastic material comprises polyketone (PK), polyetherketone (PEK), polyetheretherketone (PEEK), polyetherketoneketone (PEKK), polyetheretherketoneketone (PEEKK), polyetherketone (PEK), polyetherketoneetherketoneketone (PEKEKK), or a combination thereof.

10. The seal of claim 1, wherein the seal body is essentially free of polytetrafluoroethylene.

11. The seal of claim 1, wherein the high-performance polymer consists essentially of at least one material selected from the group consisting of polyetheretherketone (PEEK), polyetherketoneketone (PEKK), polyetheretherketoneketone (PEEKK), polyetherketone (PEK), and polyetherketoneketoneetherketone (PEKEEK).

12. The seal of claim 1, wherein the high-performance polymer consists essentially of polyetheretherketone (PEEK).

13. The seal of claim 1, wherein the seal body comprises a weld, wherein the coating overlies at least a portion of the weld.

14. The seal of claim 1, wherein the coating comprises polytetrafluoroethylene (PTFE), tetrafluoroethylene-hexafluoropropylene (FEP), perfluoroalkoxyethylene (PFA), or any combination thereof.

15. A seal, comprising a seal body and a coating disposed on an entire outer peripheral surface of the seal body, wherein:
   the seal body comprises a high-performance thermoplastic material optionally filled with a filler material, wherein the high-performance thermoplastic material comprises polyarylketone, polyimide, aliphatic and aromatic polyamide (PA or PPA), polyester, polyetherimide (PEI), polyamideimide (PAI) liquid crystal polymer (LCP), polybenzimidazole (PBI), ultra high molecular weight polyethylene (UHMWPE), polysulfones (PPS, PES, PPSU, PESU), polytetrafluoroethylene perfluoroether (PFA), polycholoro-trifluoroethylene (PCTFE), polyethylenetetrafluoroethylene (ETFE, polyvinlyledene fluoride (PVDF) Polyvinylfluoride (PVF), polyvinyledene fluoride-hexafluoropropylene (VF2-HFP), polyketone (PK), polyetherketone (PEK), polyetheretherketone (PEEK), polyetherketoneketone (PEKK), polyetheretherketoneketone (PEEKK), polyetherketoneetherketoneketone (PEKEKK), or any combination thereof; and
   the coating comprises a fluoropolymer polytetrafluoroethylene (PTFE), tetrafluoroethylene-hexafluoropropylene (FEP), perfluoroalkoxyethylene (PFA), or any combination thereof,
   wherein the seal body comprises a weld, wherein the coating overlies at least a portion of the weld.

16. The seal of claim 15, wherein the high-performance thermoplastic material forms a matrix extending throughout the seal body.

17. The seal of claim 15, wherein the coating has a thickness of at most 20 microns and at least 1 micron, wherein the coating defines:
   at least a portion of an outermost surface that defines an outer diameter of the seal;
   at least a portion of an innermost surface that defines an inner diameter of the seal; or
   both.

18. The seal of claim 15, wherein the entire seal body is formed with the high-performance thermoplastic material optionally filled with the filler material, wherein the high performance thermoplastic material comprises polyketone (PK), polyetherketone (PEK), polyetheretherketone (PEEK), polyetherketoneketone (PEKK), polyetheretherketoneketone (PEEKK), polyetherketone (PEK), polyetherketoneetherketoneketone (PEKEKK), or a combination thereof; and wherein the coating consists essentially of polytetrafluoroethylene.

19. The seal of claim 1, wherein the seal body has an elongation at break of at least 5%.

20. The seal of claim 1, wherein the fluoropolymer comprises a functionalized fluoropolymer.

* * * * *